(12) United States Patent
Bernauer et al.

(10) Patent No.: US 6,329,736 B1
(45) Date of Patent: Dec. 11, 2001

(54) ELECTRONICALLY COMMUTATED MOTOR

(75) Inventors: Christof Bernauer, Forbach; Wofgang Krauth, Sasbachrie, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/446,224

(22) PCT Filed: Jun. 8, 1998

(86) PCT No.: PCT/DE98/01559

§ 371 Date: Mar. 24, 2000

§ 102(e) Date: Mar. 24, 2000

(87) PCT Pub. No.: WO98/58443

PCT Pub. Date: Dec. 23, 1998

(30) Foreign Application Priority Data

Jun. 17, 1997 (DE) .............................................. 197 25 522

(51) Int. Cl.[7] .......................... H02K 29/02; H02K 29/08
(52) U.S. Cl. .......................... 310/254; 310/191; 310/209
(58) Field of Search .................................. 310/254, 216, 310/193, 68 R, 191, 68 B, 209; 318/254, 138, 439, 345, 331

(56) References Cited

U.S. PATENT DOCUMENTS

| 3,873,898 | 3/1975 | Muller | 318/138 |
| 4,554,491 | 11/1985 | Plunkett | 310/254 |
| 4,804,873 | 2/1989 | Manabu et al. | 310/67 R |
| 4,899,075 | * | 2/1990 | Hasebe | 310/257 |
| 4,900,963 | * | 2/1990 | Amano et al. | 310/187 |
| 5,962,938 | * | 10/1999 | Bobay et al. | 310/67 R |

FOREIGN PATENT DOCUMENTS

| 0 040 484 | 11/1981 | (EP) . |
| 2 636 182 | 3/1990 | (EP) . |

\* cited by examiner

Primary Examiner—Tran Nguyen
(74) Attorney, Agent, or Firm—Kenyon & Kenyon

(57) ABSTRACT

An electronically commutated motor is described that has a stator, carrying at least two winding phases, multiple magnet poles and grooves and a rotor, in which a defined position between the rotor and the stator can be detected by way of a position sensing device. A rotation speed and power output of the motor can easily be influenced by the fact that the magnet poles have regions with air gaps of different heights from the rotor; and that onset times of a temporally successively occurring energization of the at least two winding phases can be varied in terms of the position between the rotor and the stator and/or the energization duration of the at least two winding phases.

9 Claims, 5 Drawing Sheets

ELECTRONICALLY COMMUTATED MOTOR

FIELD OF THE INVENTION

The present invention relates to an electronically commutated motor that has a stator, carrying at least two winding phases, multiple magnet poles and grooves and a rotor, in which a defined position between the rotor and the stator can be detected by way of a position sensing device.

BACKGROUND INFORMATION

In the case of conventional electronically commutated motors of this kind, graduation of output is usually implemented by varying the electronic activation, e.g. by pulse width modulation of the power output stage of the energization device. When the power output stage is cycled, this results in additional electronic losses and thus, in a reduction in motor efficiency. Attempts have been made to graduate the output by way of special winding variants, but this results in increased manufacturing cost for of the stator.

SUMMARY OF THE INVENTION

An object of the present invention, in the case of an electronically commutated motor, is to graduate output and influence rotation speed with a simple motor configuration for the stator and with low-loss energization.

According to the invention, this object is achieved in that the magnet poles have regions that have air gaps of different heights from the rotor; and the onset times of the temporally successively occurring energization of the winding phases can be varied in terms of the position between the rotor and the stator and/or the energization durations of the winding phases.

With a winding configuration known per se it is possible, merely by way of the configuration of the magnet poles on the stator and by varying the energization time and/or energization duration, to obtain a different working characteristic curve and/or cover a large working field.

According to an embodiment, energization of the winding phases is accomplished periodically. The period duration, energization onset times and/or durations of the energization and/or the current determine the rotation speed and/or power output of the motor. In this context, for energization over the entire period of time, energization of the winding phases may occur in immediate succession; while for partial energization, activations of the winding phases can be performed with a time interval in between.

The magnet poles of the stator can form air gaps set back in stepped fashion from the rotor, or can have regions in which the air gap with respect to the rotor continuously changes.

If, according to an embodiment, the grooves alternately delimit wide magnet poles and narrow return flux poles, and for the winding phases to have subwindings, alternately nested into one another, that are each wound around only one magnet pole and change winding direction from one subwinding to another or—if the current direction is different—are wound in the same direction, the result is a winding configuration in which the winding phases do not overlap. This eliminates winding terminations at the axial ends of the stator, thus making production of the stator simpler and less expensive. The motor also requires less space and has higher efficiency.

The motor can be configured as an internal-rotor or external-rotor motor. It is advantageous in this context if the rotor is equipped with permanent magnets. The different working characteristic curves—governed by the differing height of the air gaps in the region of the magnet poles—can also be achieved with an electrically excited motor.

DETAILED DESCRIPTION

Figure 1:
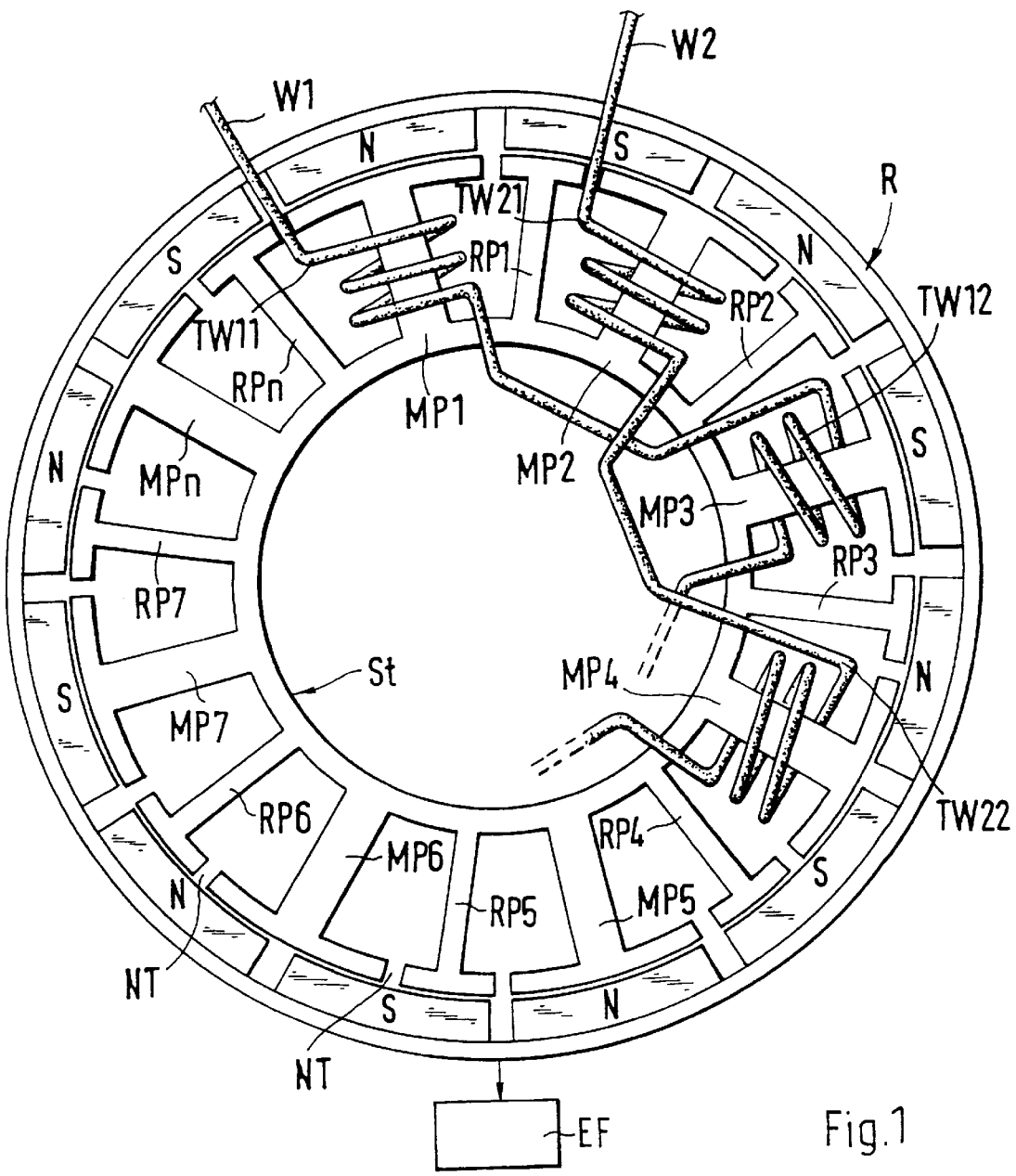
FIG. 1 shows a motor configuration according to the present invention.

As shown by the motor configuration according to FIG. 1, in an external-rotor motor a stator St is surrounded by a rotor R that alternatingly carries north poles N and south poles S. These north and south poles can preferably, but not exclusively, be permanent magnets that face toward stator St with concave pole surfaces. Stator St itself is subdivided by grooves NT that delimit T-shaped magnet poles MP1, MP2, MP3, MP4, MP5, MP6, MP7, and MPn, and return flux poles RP1, RP2, RP3, RP4, RP5, RP6, RP7, and RPn. As is evident from FIG. 6, magnet poles MP1 through MPn constitute, with respect to the pole surfaces of rotor R, regions B1 and B2 that have short and tall air gaps L1 and L2. Height regions B1 and B2 extend over the same angular region of stator St, i.e. they are of approximately the same width. Both regions B1 and B2 also cover the angular region of the pole surface of the permanent magnets. The pole surfaces of return flux magnets RP1 through RP8 extend over only approximately half the angular region of magnet poles MP1 through MPn, and north and south poles N and S.

Associated with rotor R is a position sensing device EF that indicates that rotor R has reached a defined position with respect to stator St so as to yield a time reference variable t0 for onset time t1 and t2 for energization of winding phases W1 and W2 of stator St.

Figure 2A:
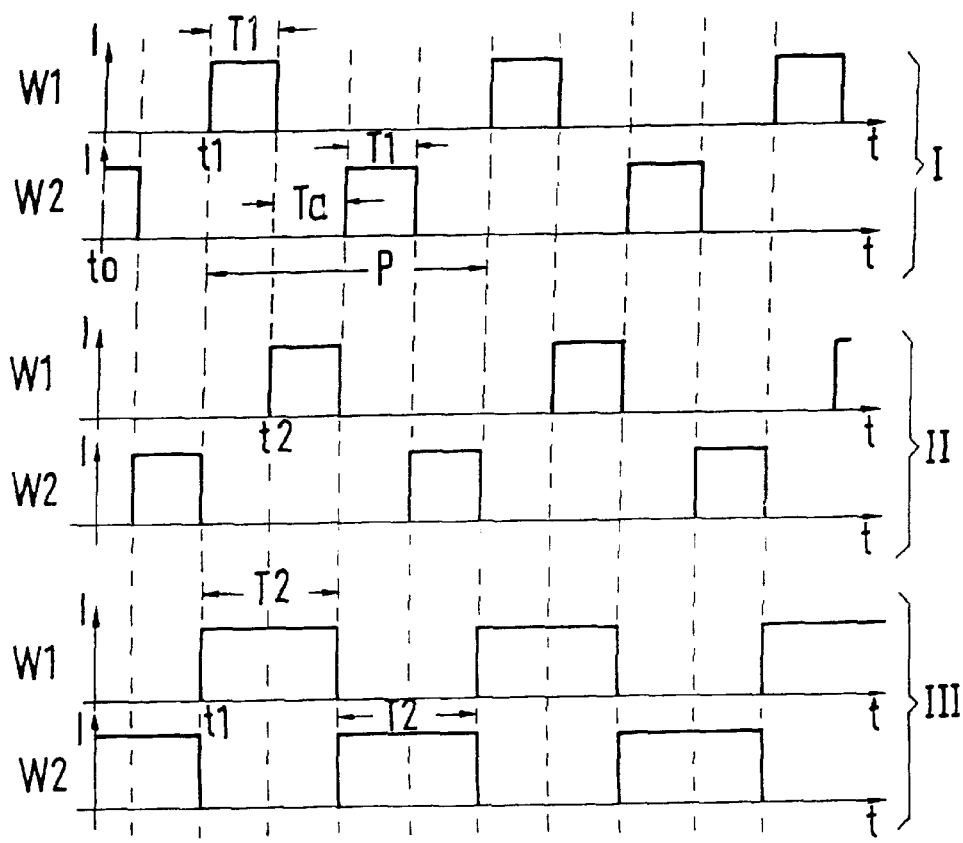
FIGS. 2a and 2b show various energization diagrams for the two winding phases of the motor show in FIG. 1.
Figure 2B:
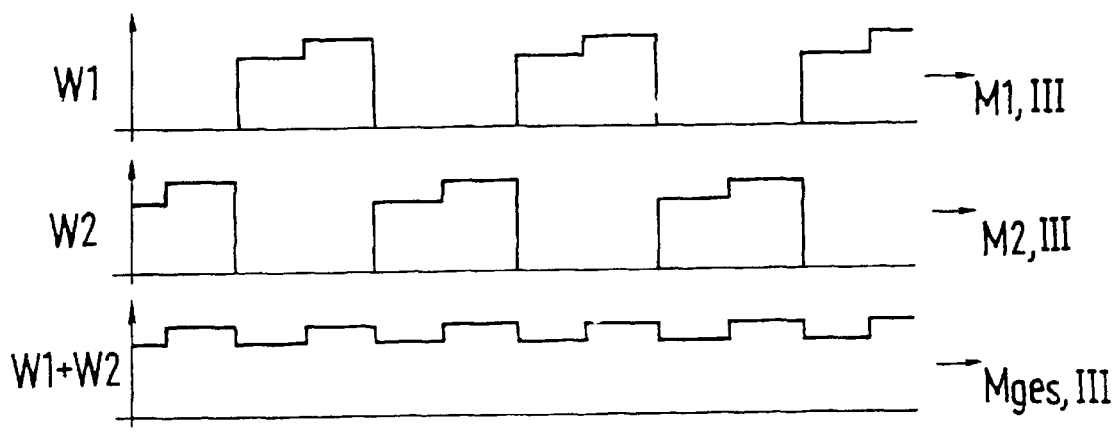

FIGS. 2a and 2b depict energization diagrams for winding phases W1 and W2. It is assumed in this context that the zero point at t0 corresponds to the time at which the defined position between R and stator St is reached. The respective associated working characteristic curves are depicted in FIG. 3.

Figure 3:
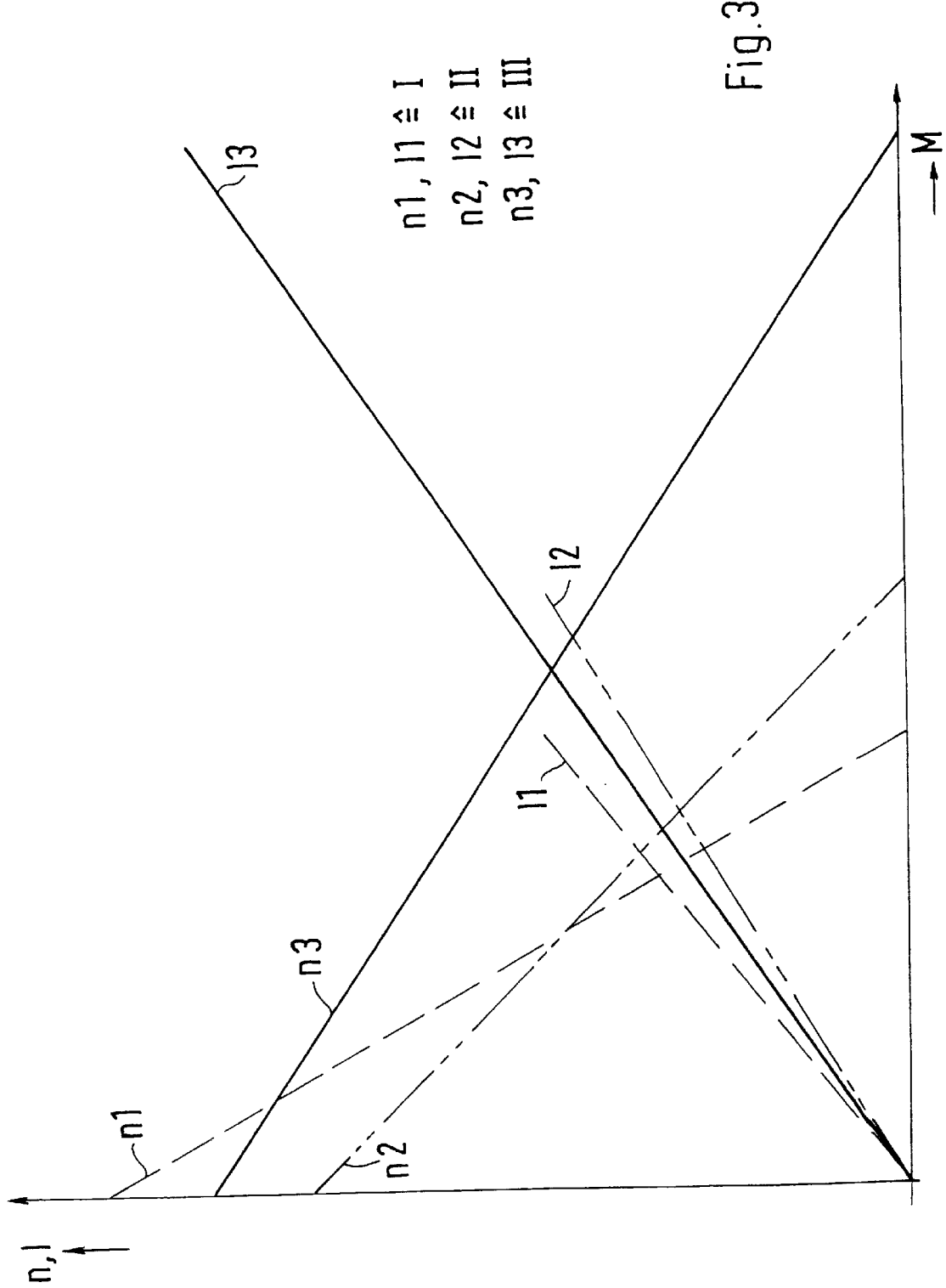
FIG. 3 shows working characteristic curves of the motor shown in FIG. 1, taking into account air gaps, onset times, and energization durations shown in FIG. 2.

If energization of winding phase W1 is begun at time t1, and if energization is repeated in pulsed fashion each time with a period P of equal length, the result is the motor working characteristic curves labeled n1 and l1 in FIG. 3, if energization is performed when air gaps L2 are effective. The energization duration accounts for only a portion, e.g. one-quarter, of period P. As shown by diagram pair I in FIG. 2a, energization of winding phase W2 occurs with an offset of half a period P, and is periodic in the same fashion, so that an unenergized interval Ta is present between energization of winding phase W1 and energization of winding phase W2.

If energization of winding phase W1 does not occur until time t2 (diagram pair II), the working characteristic curves obtained—retaining the same period P and the same energization conditions for the two winding pairs W1 and W2—are those labeled n2 and l2 in FIG. 3. Energization then coincides with the position of rotor R and stator St when air gaps L1 are active.

If winding phases W1 and W2 are energized in accordance with diagram pair III of FIGS. 2a and 2b, the result is then, assuming an onset time t1 for winding phase W1 and an energization duration that corresponds in each case to one-half of period P, the working characteristic curves labeled n3 and l3 in FIG. 3.

FIG. 3 shows a plot of the proportional torques M1 and M2 and total torque Mges of the motor resulting from an energization of winding phases W1 and W2 using onset time t1 and the energization profile according to diagram pair III.

Figure 4:
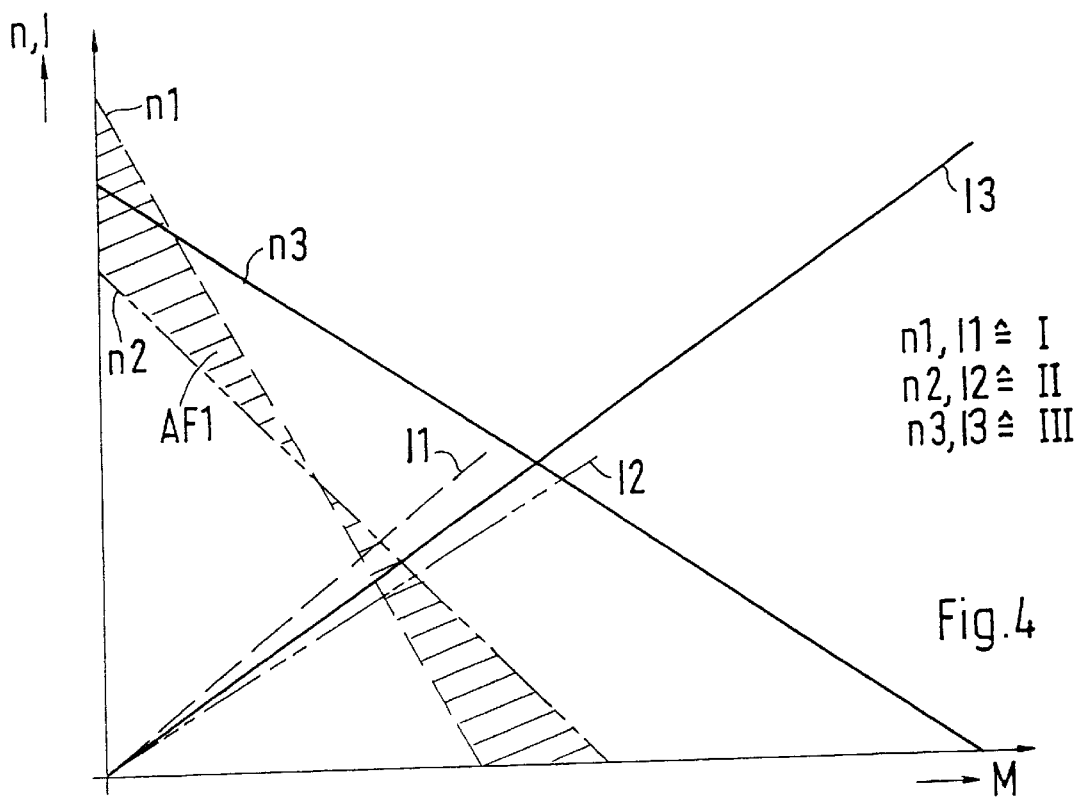
FIG. 4 shows a working range of a motor, according to the present invention, that may be covered by varying the energization onset time.

FIG. 4 shows a plot of the working characteristic curves obtained using energization diagram pairs I and II as shown in FIG. 2. These two energization diagram pairs I and II for winding phases W1 and W2 differ only in terms of onset times t1 and t2, so that by changing the onset time from t1 to t2 it is possible to cover the shaded working range AF1 shown in FIG. 4.

Figure 5:
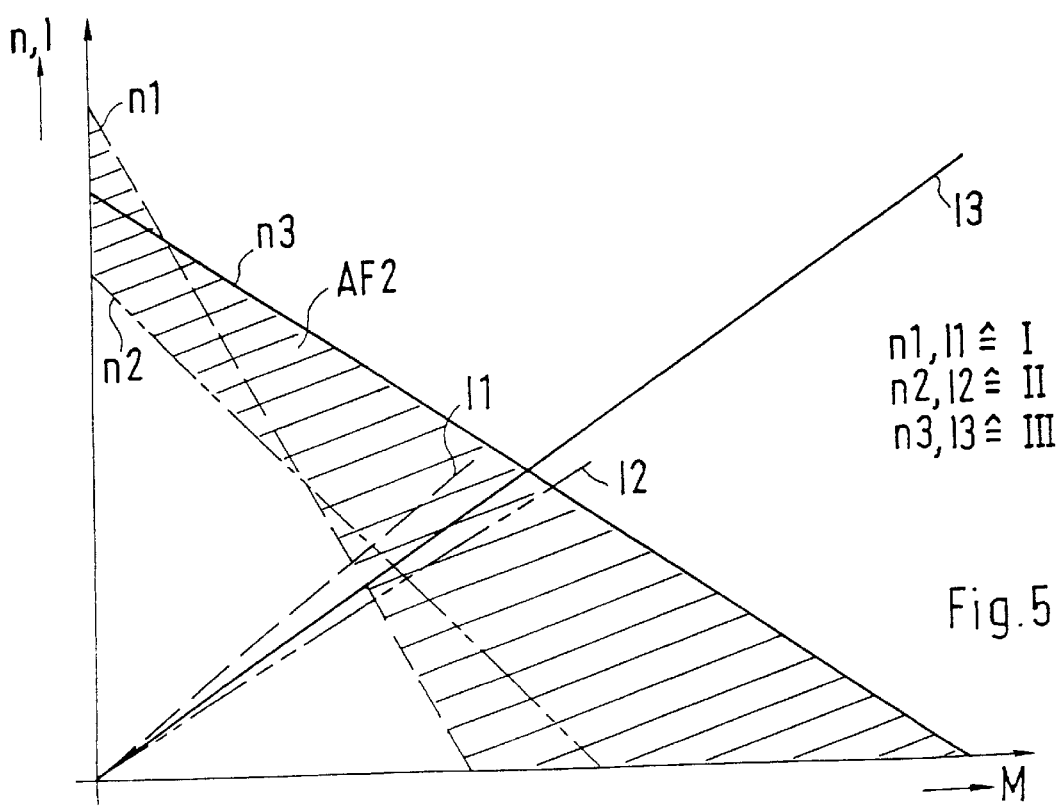
FIG. 5 shows a working range of a motor, according to the present invention, that may be covered by varying energization onset time and energization duration.

Considering now the working characteristics curve in FIG. 5 for energization using diagram pair III shown in FIGS. 2a and 2b, it is evident that the substantially larger shaded working range AF2 can be covered by changing the onset time from t1 to t2 and changing the energization duration from one-quarter to one-half of period P for winding phases W1 and W2.

Figure 6:
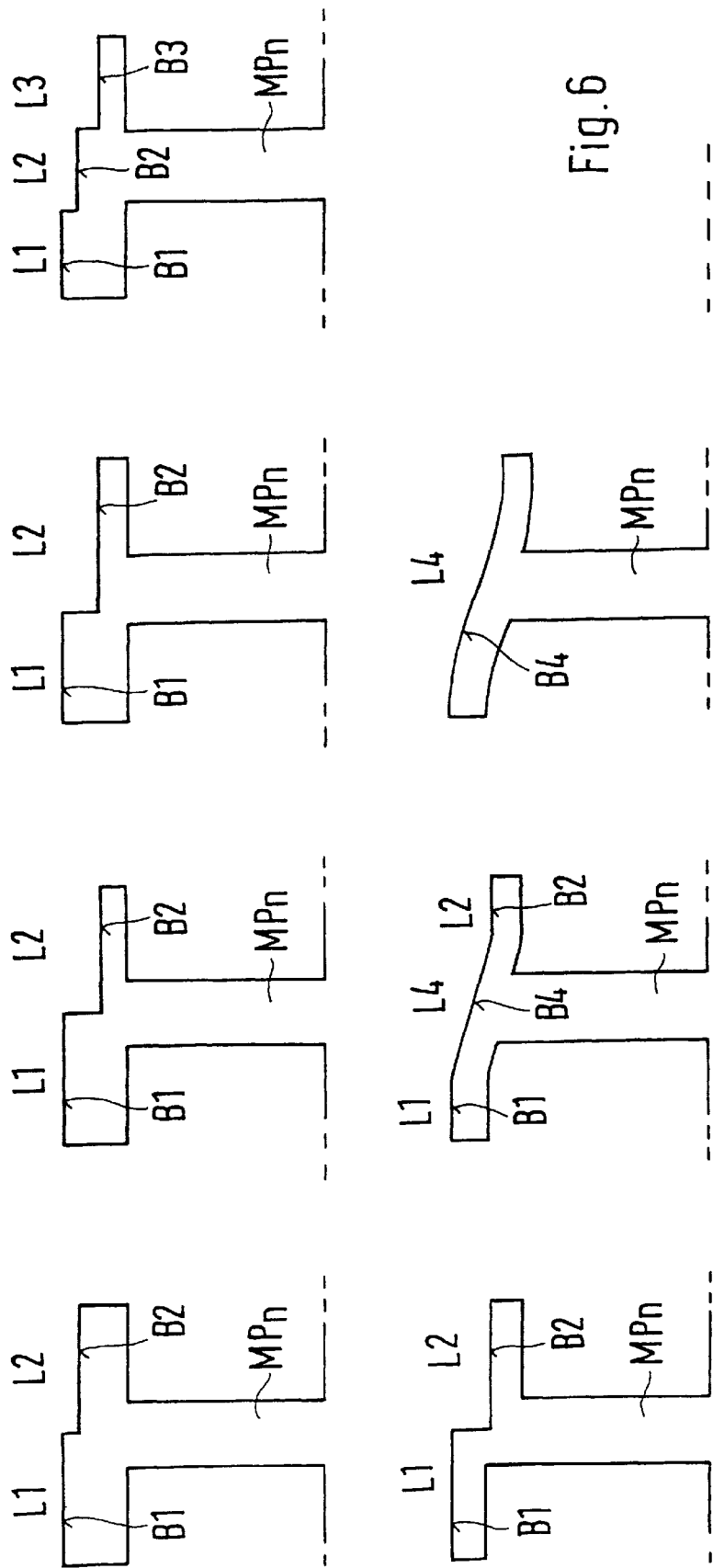
FIG. 6 shows embodiments of magnet poles according to the present invention.

FIG. 6 shows different embodiments of the pole surfaces for magnet poles MPn of stator St. In this context, regions B1, B2, and B3 that have air gaps L1, L2, and L3 of different heights can extend over the same angular region of the magnet pole or also over angular regions of different sizes. The regions also can be of multi-stepped configuration. In addition, air gaps L4 also can continuously increase or decrease over region B4, and can be a curved configuration. The regions on magnet poles MPn also can be of different sizes and can be equipped with different air gaps.

The present invention is also applicable to stators St wound in different fashions, and is not limited to the configuration of stator St and rotor R shown in FIG. 1. The motor also can be configured as an internal-rotor motor, and the rotor can be electrically excited.

What is claimed is:

1. An electronically commutated motor, comprising:
   a rotor; and
   a stator including:
      at least two winding phases energized in temporally successive fashion,
      a plurality of grooves, and
      a plurality of magnet poles subdivided into a plurality of regions, wherein:
         the plurality of regions include air gaps of different heights from the rotor and different working characteristic curves,
         the different working characteristic curves are capable of being selected via at least one of onset times of the at least two winding phases and energization durations of the at least two winding phases, and
         a position sensing device capable of being associated with the rotor detects a defined position between the rotor and the stator.

2. The motor according to claim 1, wherein:
the at least two winding phases are energized in subregions of a time period.

3. The motor according to claim 2, wherein:
a time interval occurs between the energization of the at least two winding phases.

4. The motor according to claim 2, wherein:
the energization of the at least two winding phases occurs in immediate succession.

5. The motor according to claim 1, wherein:
the plurality of magnet poles forms the plurality of air gaps according to an arrangement that is set back in a stepped fashion from the rotor.

6. The motor according to claim 1, wherein:
at least some of the plurality of regions of the plurality of magnet poles are associated with continuously varying air gaps.

7. The motor according to claim 1, wherein:
the plurality of magnet poles includes a plurality of wide magnet poles and a plurality of narrow return flux poles,
the plurality of grooves alternately delimits the plurality of wide magnet poles and the plurality of narrow return flux poles, and
the at least two winding phases include subwindings alternately nested into one another, the subwindings each being wound around only one magnet pole of the plurality of magnet poles, the subwindings being disposed according to one of an arrangement in which the winding direction changes from one subwinding to another and an arrangement in which the winding direction is in the same direction if a current direction is different.

8. The motor according to claim 1, wherein:
the motor is an external-rotor motor,
the rotor surrounds the stator, and
the rotor is equipped with permanent magnets.

9. The motor according to claim 1, wherein:
the motor is an internal-rotor motor,
the stator surrounds the rotor, and
the rotor is equipped with permanent magnets.

* * * * *

UNITED STATES PATENT AND TRADEMARK OFFICE
CERTIFICATE OF CORRECTION

PATENT NO. : 6,329,736 B1
DATED : December 11, 2001
INVENTOR(S) : Bernauer et al.

It is certified that error appears in the above-identified patent and that said Letters Patent is hereby corrected as shown below:

Column 1,
Line 27, change "According to the invention, this" to -- According to the present invention, the --.
Line 55, change "For the winding phases to" to -- the winding phases --.

Signed and Sealed this

Eighth Day of April, 2003

JAMES E. ROGAN
*Director of the United States Patent and Trademark Office*